C. J. CARROLL.
PLATE FOR SECURING WEATHERPROOFING.
APPLICATION FILED APR. 2, 1913.
1,102,871.  Patented July 7, 1914.
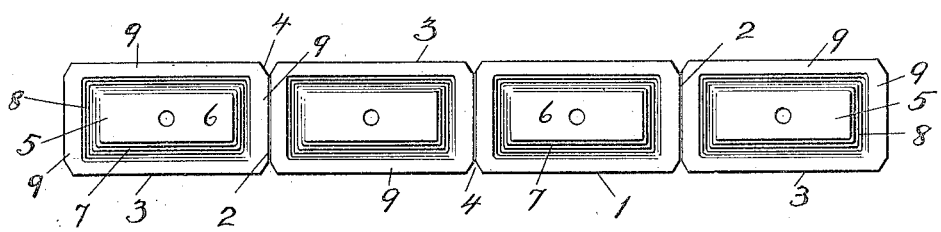
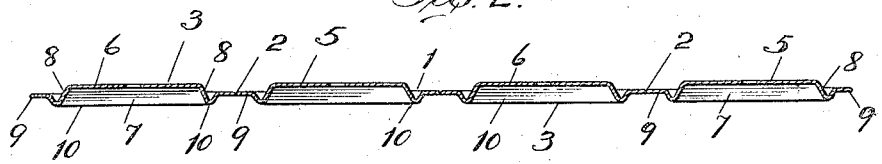
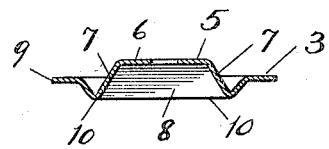
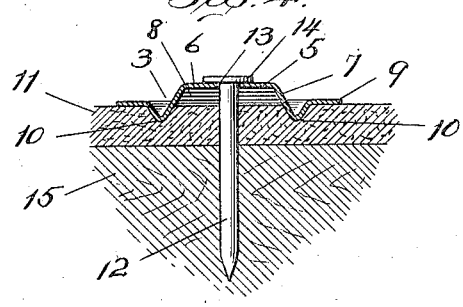
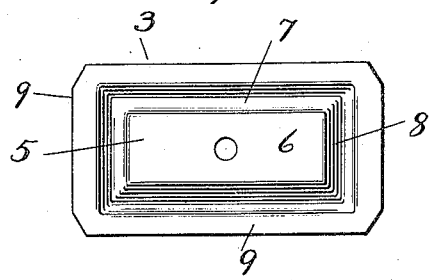
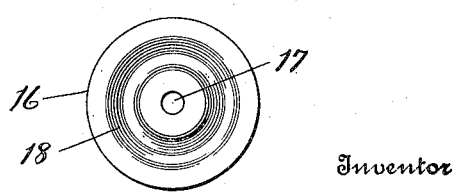
Witnesses
Edwin L. Bradford
G. Ferd. Vogt
Inventor
Charles J. Carroll
By Mann & Co.
Attorneys

UNITED STATES PATENT OFFICE.

CHARLES J. CARROLL, OF BALTIMORE, MARYLAND.

PLATE FOR SECURING WEATHERPROOFING.

1,102,871. Specification of Letters Patent. Patented July 7, 1914.

Application filed April 2, 1913. Serial No. 758,289.

*To all whom it may concern:*

Be it known that I, CHARLES J. CARROLL, a citizen of the United States, residing at Baltimore, in the State of Maryland, have invented certain new and useful Improvements in Plates for Securing Weatherproofing, of which the following is a specification.

This invention relates to an improved sealing and securing plate or cleat and has particular reference to a metal cleat for securing sheets of prepared weather-proofing material upon buildings.

The main object of the invention is to provide an improved construction of sheet metal cleat having a perforation through which a driven headed fastening may be passed to secure it against the weatherproofing material and also having an endless sealing means extending entirely about the securing means to form an endless seal and prevent water working under the plate from any side where it would be shielded from the sun and wind and cause injury to the weatherproofing material.

The inventive idea may be carried out in various ways but the accompanying drawing discloses several examples of devices embodying the invention, wherein, Figure 1, shows a series of connected plates forming a continuous strip and each nail receiving perforation of the strip being bound by its separate and distinct endless sealing means. Fig. 2, illustrates the metal strip in longitudinal section. Fig. 3 shows an enlarged cross-sectional detail through one of the plates. Fig. 4, illustrates an enlarged sectional detail through a board; the weatherproofing material; the plate and also shows a nail driven through the plate and pressing the endless sealing projection into sealing contact with the weatherproofing material. Fig. 5 shows a top plan view of one of the plates of a rectangular form, and Fig. 6, illustrates a circular plate embodying the invention.

Referring particularly to Figs. 1 and 2, of the drawing it will be noted that the metal strip, 1, has a series of crosswise indentations or grooves, 2, at regular intervals apart thereby weakening the strip at the indentations or grooves and practically producing a series of connected plates, 3. At the opposite ends of each crosswise groove or indentation the longitudinal side edges of the strip has V-shaped notches, 4, so that a ready separation of the plates of the strip may be effected at any of the grooves or indentations.

Each plate of the strip has a central raised portion, 5, with a preferably flat upper surface, 6, from which downwardly and outwardly-inclined walls, 7, and, 8, extend. In the forms of devices shown in Figs. 1 to 5 the inclined walls, 7, are longitudinal side walls while the walls, 8, may be considered end walls because they connect the so-called side walls. A flange, 9, extends laterally and horizontally from around the central raised portion, 5, and in the rectangular form of plate this horizontal flange is present at both sides and both ends of the raised portion and bounds said raised portion but said flange has position in a horizontal plane below the upper surface, 6, of the said raised portion. An endless sealing projection, 10, is also provided on each plate or on the strip so as to entirely surround or bound each raised portion whereby to form an endless seal with the weatherproofing material all around the said raised portion, as will hereinafter be more fully explained.

The sealing projection, 10, is preferably located at the base of the inclined walls of the central raised portion for reasons presently to be explained but it may depend from the lowermost side of the plate below the horizontal flange, 9, at any desired point between the base of the raised portion and the rim-edge of the horizontal flange. By locating the sealing projection on the bottom or lowermost side of the plate and at, or close to, the base of the inclined walls of the central raised portion, the act of securing the plate in place against the weatherproofing material, 11, as shown in Fig. 4, by driving a nail, 12, through a suitable opening, 13, in the central portion, will cause the nail head 14, after the latter seats on the surface, 6, of the central portion, to embed the endless sealing projection around each nail opening in the weatherproofing material and by making a continuous or endless seal effectually prevent water from working beneath the central portion of the plate from any side.

By referring to Fig. 4, it will be noted that the nail, 12, will first pass through the opening, 13, in the central portion of the plate, then through the weatherproofing material and finally into the wood structure, 15, against which the material, 11, is laid, and the pull of the nail-head on the central portion of the plate will be transferred through the inclined walls to the sealing projection, 10, to embed the latter in the material. By therefore locating the sealing projection at the base of the inclined walls substantially the direct action of a hammer blow on the nail head, 14, after the head seats on the central raised portion will be transferred through the inclined walls to the sealing projection and the location of the projection at the base of the raised portion is preferable for this reason although not essential.

In Fig. 6, the plate, 16, is shown as having a circular form but it nevertheless embodies the features of the invention because it has a nail hole, 17; an endless recessed portion, 18, on the upper side which produces a corresponding endless sealing projection on the under side so as to encircle the central portion and nail hole and form a seal all the way around the point where the nail passes through.

Having thus described my invention what I claim and desire to secure by Letters Patent is:—

1. A securing cleat for weatherproofing material comprising a single-thick plate having a central portion with an exposed nail-receiving perforation therein and a lateral flange portion which bounds the central portion and said plate having an endless sealing projection on the under side thereof between the central portion and the rim edge of the lateral flange portion, which endless sealing projection extends entirely around the central portion and the perforation therein and projects below the said flange portion.

2. A securing cleat for weatherproofing material comprising a single-thick plate having a central raised portion with an exposed nail-receiving perforation therein and a lateral flange which entirely bounds the said central raised portion and perforation and said plate also having a sealing projection around the base of the central raised portion and between said raised portion and the rim-edge of the plate flange.

3. A sealing cleat for weatherproofing material comprising a strip of sheet metal having a series of spaced-apart perforations therein and said metal strip having an endless sealing projection around each perforation each projection extending below the lowermost side of the cleat.

4. A sealing cleat for weatherproofing material comprising a strip of sheet metal having a series of spaced-apart crosswise weakening indentations with a perforation in the strip between each two of said indentations and said metal strip also having a sealing projection extending below its lowermost side between each two of said indentations and each sealing projection extending all the way around a perforation.

In testimony whereof I affix my signature in presence of two witnesses.

CHARLES J. CARROLL.

Witnesses:
G. FERD VOGT,
CHAS. B. MANN.